Feb. 4, 1958        G. C. BLAKE        2,821,944
PRESSURE INJECTION-TYPE APPLICATOR FOR FLUID
Filed Sept. 19, 1955
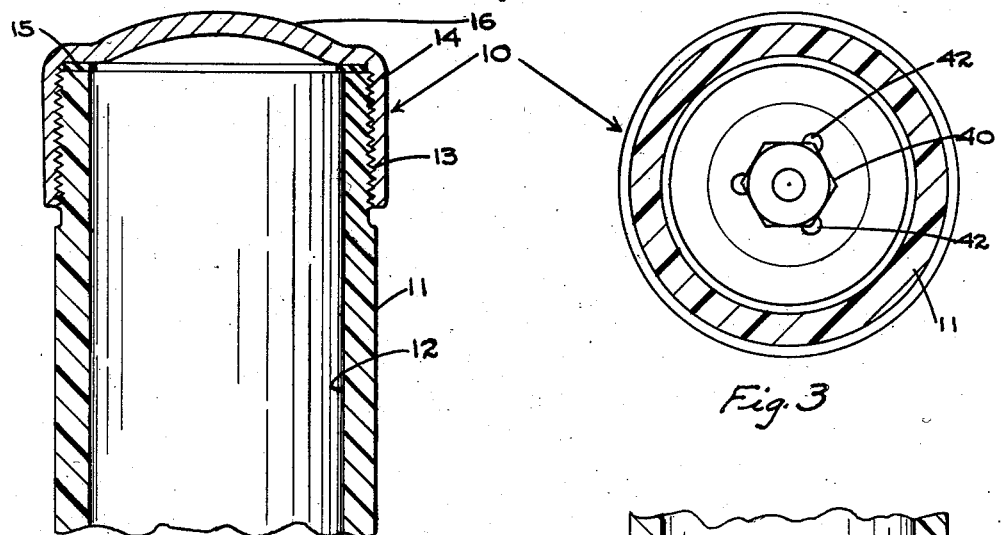
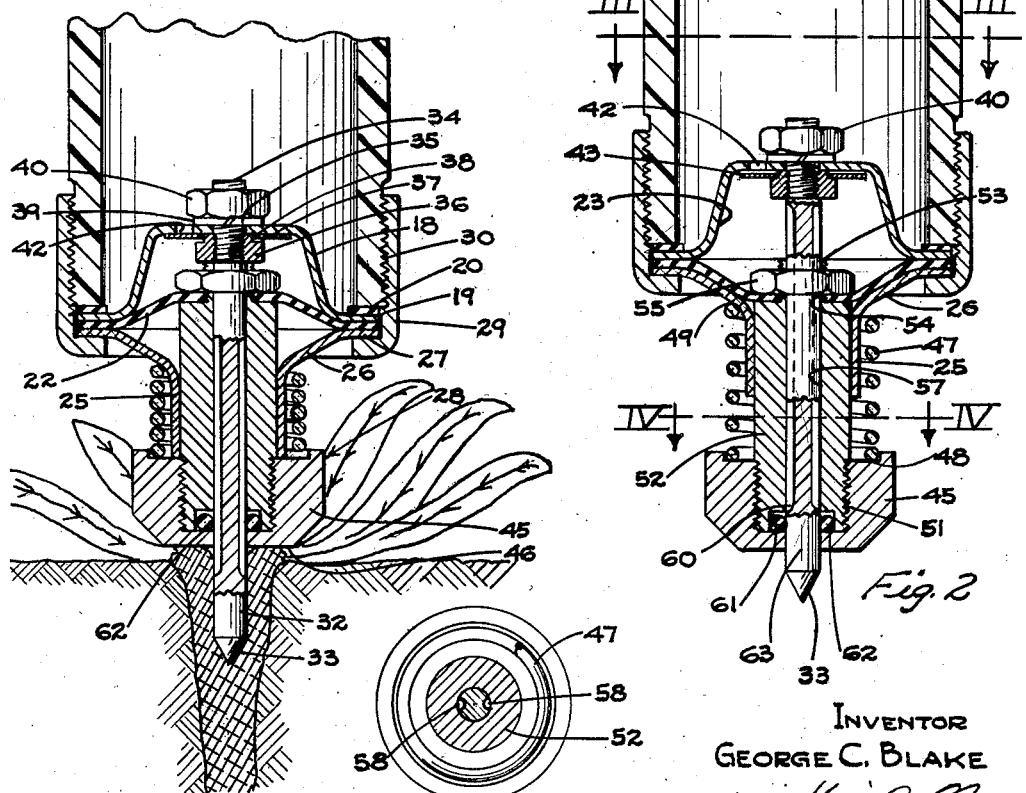
INVENTOR
GEORGE C. BLAKE
BY
ATTORNEY

United States Patent Office 2,821,944
Patented Feb. 4, 1958

2,821,944

PRESSURE INJECTION-TYPE APPLICATOR FOR FLUID

George C. Blake, Los Angeles, Calif.

Application September 19, 1955, Serial No. 535,057

10 Claims. (Cl. 111—7.3)

This invention relates to a pressure injection-type applicator or dispensing device for fluid and more particularly to an applicator for direct subsurface injection under pressure of an exterminating fluid into a weed or other undesirable plant growth.

Selective destruction of individual weeds in a lawn or garden is often preferred to area applications of weed exterminating fluid because, in the latter application, damage may occur to other desirable plants. This invention contemplates a pressure injection-type applicator for a weed exterminating fluid which comprises a simple inexpensive readily manipulated device which may be readily positioned on a weed to be killed, forced into the weed, and simultaneously inject weed killing fluid thereinto.

The applicator of this invention, generally speaking, includes an elongated hollow tubular member providing a reservoir for a supply of exterminating fluid. At the lower end of the tubular member is provided a chamber for a selected quantity of fluid to be dispensed and a pointed piercing member which extends below the chamber for direct contact with a weed. The pointed piercing member is provided with passageways for flow of fluid from the chamber and is rigidly connected to the tubular member so that downward pressure applied upon a pressure surface at the top end of the tubular member is positively and directly transmitted to the pointed piercing member so as to force the pointed member into the weed. Upon penetration of the weed to a selected depth, further pressure upon the applicator will cause ejection of fluid from the chamber in direct proportion to the pressure force applied to the applicator to forcibly inject the fluid inside the weed.

A primary object of this invention, therefore, is to disclose and provide a pressure injection-type applicator for fluid for use in selectively exterminating undesirable plant growth.

An object of this invention is to disclose and provide such an applicator wherein penetration of a weed is facilitated by rigid construction of the applicator so as to provide direct transmission of pressure from a pressure face provided thereon to a weed piercing member.

Another object of this invention is to disclose and provide an applicator as described above which is arranged to eject a preselected quantity of fluid.

A further object of this invention is to disclose and provide an applicator arranged to eject a preselected quantity of fluid wherein a chamber for said fluid includes a flexible wall or diaphragm which is responsive to pressure applied to the applicator to exert pressure on fluid in said chamber, and which is biased to such fluid into the chamber from a reservoir.

A still further object of this invention is to disclose and provide an applicator as described above wherein surface engagement means are carried at one end of the applicator and slidably receive the piercing member.

A still further object of this invention is to disclose a surface engagement means as above mentioned which includes seal means for passageway means in the piercing member.

Other objects and advantages of this invention will be readily apparent from the following description of the drawings in which an exemplary embodiment is shown.

In the drawings:

Fig. 1 is a longitudinal sectional view of an applicator embodying this invention, the plane of said section bisecting said applicator, the applicator being shown in weed penetrating position.

Fig. 2 is a fragmentary sectional view taken in the same plane as Fig. 1 but showing the applicator in normal inoperative position.

Fig. 3 is a transverse sectional view taken in the plane indicated by line III—III of Fig. 2.

Fig. 4 is a transverse sectional view taken in the plane indicated by line IV—IV of Fig. 2.

An applicator or dispensing device of this invention, generally indicated at 10, may comprise a hollow elongated tubular member 11 providing a reservoir 12 for containing a supply of selected exterminating fluid of any suitable formula and composition. The tubular member 11 may be made of a selected transparent plastic material to permit observation of the amount of fluid contained in reservoir 12. It is understood that tubular member 11 may be made of other suitable materials unaffected by and resistant to a selected exterminating fluid to be held in reservoir 12.

Tubular member 11 may be of selected length, preferably about 30 to 36 inches long so as to be readily held and operated by a user without bending or stooping. The top end of member 11 may be externally threaded at 13 for threaded connection with a metal closure cap 14. A resilient washer 15 may be provided between top end edge face of member 11 and the opposed internal face of the cap 14. Cap 14 may be suitably configured and provides an exterior top pressure-receiving surface 16 against which a hand of the user may be positioned for applying a downwardly directed pressure force to applicator 10.

At the opposite or bottom end of tubular member 11 may be provided an inverted metal cup-shaped rigid fixed valved partition wall 18, said partition wall 18 having outwardly turned, annular flanges 19 seated against an annular resilient washer 20 provided between flange 19 and the opposed end face of tubular member 11. Also secured to tubular member 11 at its bottom end may be a flexible movable wall or diaphragm 22, annular margins of diaphragm 22 being seated on flange 19. The rigid partition wall 18 and flexible wall 22 define therebetween a chamber 23 of selected volume for holding a preselected quantity of fluid to be dispensed or ejected from the applicator. Flexible wall 22 may be made of suitable resilient material, such as synthetic rubber or plastic compositions capable of resisting deterioration by the exterminating fluid selected for use.

A metal downwardly directed sleeve 25 having an outwardly flared top end portion 26 terminating in an annular flange 27 seated against the margins of diaphragm 22 provides a guide for surface engagement means 28 movable relative thereto as described hereafter. A flanged metal ring 29 secures washer 20, flange 19, margins of diaphragm 22, and sleeve 26 to the lower end of tubular member 11 as by threaded engagement with threaded end portion 30 of member 11.

Rigidly and fixedly carried by partition wall 18 is a downwardly extending weed piercing member 32, said member 32 having a pointed end 33 to facilitate penetration thereby of a weed or other plant. The piercing member 32 may be an elongated rod provided at its end opposite to pointed end 33 with an external threaded end 34 which extends through an axial port 35 in partition wall 18. Below partition wall 18 end 34 may carry a spacing nut 36 provided with an upwardly facing annular shoulder 37 defined by a reduced top end section 38. Spacer nut 36, in this example, is threaded to the inner end of threads 34 and the top edge face of reduced portion 38 may be seated against partition wall 18. Above wall 18 may be provided a lock washer 39 and nut 40 for rigidly securing the piercing member to wall 18.

Valved port means are provided between reservoir 12 and chamber 23, said valved port means including a plurality of spaced ports 42 in wall 18 and a floating annular metal valve member 43 loosely fitted on reduced section 38 of the spacer nut 36. Valve member 43, in normal inoperative position, is seated on shoulder 37 (Fig. 2) and ports 42 are open to admit fluid from reservoir 12 to chamber 23. In closed position, valve member 43 is pressed against the internal surface of wall 18 to close ports 42 by pressure of fluid in chamber 23 as later described and as shown in Fig. 1.

Surface engagement means 28 includes an enlarged ported cap 45 having a downwardly directed pressure face 46 for contact with a surface or object which is to be pierced by member 32. Cap 45 is biased downwardly by a suitable coiled external spring 47 which encircles sleeve 25, one end of said spring being seated in an annular recess 48 on cap 45 and the other end being seated as at 49 against the exterior surface of outwardly flared portion 26.

Cap 45 may be threadedly connecetd as at 51 to a cylindrical actuator member 52 for flexible wall 22, said actuator member 52 being provided with an upwardly extending, externally threaded reduced end 53 which extends through an axial opening 54 in flexible wall 22. A securing nut 55 threaded on end 53 comprises margins of flexible wall 22 defining opening 54 against end surfaces of the actuator member to sealingly connect the actuator member to the flexible wall. The actuator member 52 is slidable within guide sleeve 25 and is provided with an axial bore 57 which slidably receives piercing member 32.

Passageway means for flow of fluid from chamber 23 to the lower end of piercing member 32 may be provided by a pair of diametrically opposed external grooves 58 formed in piercing member 32. Grooves 58 extend from an upper point on member 32 adjacent to threaded portion 34 to a lower point 60 spaced a selected distance from pointed end 33. As shown best in Fig. 2, in normal position point 60 lies above an annular internal recess 61 provided in actuator member 52, said recess 61 receiving a resilient fluid-resistant O-ring 62 which sealingly engages a bottom cylindrical surface portion 63 of member 32 so as to prevent leakage and loss of fluid from chamber 23.

When applicator 10 is employed to exterminate a weed, normal position of parts of the device 10 is shown in Fig. 2. Fluid to be dispensed is contained in chamber 23 and in grooves 58 in piercing member 32, O-ring 62 providing the seal to prevent loss of fluid from grooves 58. Flexible wall 22 is resting on outwardly flared portion 26 of sleeve 25 and is biased to said position by spring 47. Pointed end 33 may be readily positioned at the heart of a weed by a user because pointed end 33 extends below tubular member 11 a sufficient distance for easy observation thereof. As a downwardly directed force is applied against pressure face 16 at the top end of tubular member 11, piercing member 32 is urged into the heart of the weed, said force being directly transmitted through tubular member 11, fixed partition wall 18 and the rigid connection of member 32 to wall 18. Piercing member 32 enters the weed without dispensing fluid until and after face 46 of surface engagement means 45 contacts the top surface of the weed. Upon further pressure, surface engagement means and actuator member 52 are urged upwardly relative to and along piercing member 32 to expose lower ends of the grooves 58. Upward displacement of actuator member 52 relative to piercing member 32 also causes flexible wall 22 to move toward fixed wall 18 and to decrease the volume of chamber 23. As fluid in chamber 23 becomes subject to this upwardly directed pressure by flexible wall 22, valve member 43 is forced upwardly and closes ports 42 to the reservoir. Fluid in chamber 23, thus subjected to pressure, is forcibly ejected from chamber 23 along grooves 58 and outwardly into the pierced portion of the weed. The amount of fluid displaced from chamber 23 is measured by the displacement of flexible wall 22 from its normal resting position as in Fig. 2 to its maximum displaced position as in Fig. 1.

As applicator 10 is withdrawn from the weed, spring 47 causes the surface engagement means 45 to move downwardly relative to piercing member 32 and to move the flexible wall 22 to its normal position. Such downward movement of flexible wall 22 causes valve member 43 to move to open position and fluid from reservoir 12 is in effect sucked and positively drawn into chamber 23. The spring 47 biases caps 45 to its normal position wherein seal ring 62 sealingly engages the cylindrical surface portion 63 of the piercing member 32 so as to close the lower ends of grooves 58.

It will thus be noted that the downward force which a user applies to applicator 10 to cause piercing of a weed is also the force which causes flexible wall 22 to contract chamber 23 for causing forcible ejection of fluid therefrom. If it is desired that the fluid be gently ejected after penetration of a weed, the user can apply relatively small pressure to the applicator. If it is desired to forcibly eject the fluid, then a greater force may be applied. Some of the fluid is injected directly into the weed; other fluid will be ejected near the surface of the weed so that upon withdrawal of the piercing member some of the fluid may be spread upon the leaf portion of the weed.

Upon withdrawal it will be noted that a hole has been provided in the weed and the hole may retain a portion of the exterminating fluid for effectively killing the weed. It should be also noted that upon withdrawal, dispensing chamber 23 is positively refilled with fluid from the reservoir by the sucking action of the flexible wall as it is spring-urged to normal position. Thus chamber 23 is positively filled with fluid and the applicator is ready for use on an adjacent weed without a waiting period for filling of a chamber such as in gravity type feeds.

The piercing member 32 may be readily adjusted to a desired depth of penetration by suitably adjusting its connection to the fixed wall 18. The spacer nut 36 and nut 40 may be selectively positioned along threaded portion 34 and secured in position when the locking nut 40 is threaded tightly against fixed wall 18. It will also be noted that such adjustment for penetration of piercing member 32 also will vary the selected amount of fluid dispensed from chamber 23. It is understood that other adjustment means may be employed if desired.

The applicator 10 of this invention thus provides a simply constructed weed-killing device which is direct and positive in action to eject exterminating fluid below the surface of the ground. The applicator is constructed so that it can be readily repaired and cleaned when necessary, removal of ring 29 permitting access to fixed wall 18 and piercing member 32 without difficulty.

It should be also noted that the applicator is particularly designed for use with strong acid or corrosive-type exterminating fluids. The flexible movable wall is made of acid-resistant synthetic material, the biasing spring is external of the fluid dispensing chamber and passageways, and the piercing member and bore of the actuator member may be plated with an acid-resistant coating. Thus after a period of non-use, parts of the device in contact with the fluid will be readily movable and not corrosively bonded together.

It is understood that various other changes and modi-

I claim:

1. In a pressure injection-type applicator for fluid, the combination of: a hollow tubular member providing a reservoir for fluid and having a pressure receiving surface at one end; a rigid partition wall at the opposite end of the tubular member; a flexible wall connected to the tubular member and spaced from said partition wall to define therewith a chamber for fluid to be dispensed; valved port means in said partition wall; a pointed piercing member secured to the partition wall and extending through said flexible wall, said piercing member being provided with longitudinal exterior grooves for passage of fluid from said chamber toward said pointed end thereof; biased surface engagement means provided with a through bore slidably receiving said piercing member and secured to said flexible wall; an external sleeve guide member carried by the end of the tubular member and projecting therefrom; and seal means carried by said surface engagement means to sealingly engage said piercing member below ends of said exterior grooves.

2. In a pressure injection-type applicator for dispensing fluid, the combination of: means providing a reservoir for fluid to be dispensed; a valved wall at one end of said reservoir; a movable diaphragm spaced from said wall and defining therewith a chamber for holding a quantity of fluid; means to pierce an object and to inject fluid thereinto including a pointed piercing member secured to said wall and extending through said movable diaphragm, said piercing member being provided with passageways for flow of fluid from said chamber toward the pointed end of said piercing member; means slidably receiving said piercing member and connected to said movable diaphragm; spring means biasing said slidable means in a direction away from said diaphragm and encircling said slidable means between the diaphragm and said pointed end of the piercing member; and seal means carried by said slidable means for closing said passageways in said piercing member.

3. An applicator as stated in claim 2, including a pressure receiving face on said reservoir means.

4. In an applicator for dispensing fluid, the combination of: means providing a chamber for fluid to be dispensed including a fixed wall and a movable wall; a piercing member carried by the fixed wall and extending through the movable wall; a movable member carried by the movable wall and provided with a surface-engaging face at its end remote from the movable wall and provided with a bore to slidably receive said piercing member; passageway means extending from said chamber along said piercing member and terminating in an opening below said movable means when said applicator is under pressure; an external guide member for said movable member; and seal means carried by the movable means to seal said passageway means when said applicator is not under pressure.

5. A weed killing device including the provision of: a pointed weed piercing member provided with longitudinal passageway means; a rigid wall carrying said piercing member; means to apply pressure to said piercing member through said wall; a flexible wall defining with said rigid wall a chamber for fluid; surface engagement means having an actuator member secured to said flexible wall, said actuator member slidably receiving said piercing member; a sleeve guide member for the actuator member and providing an internal seat for the flexible wall; said passageway means extending from said chamber to below said surface engagement means when said flexible wall is positioned proximate to said rigid wall; and seal means for said passageway means when said flexible wall is positioned remotely from said rigid wall.

6. A weed killing device including the provision of: a pointed weed piercing member provided with longitudinal passageway means; a rigid wall carrying said piercing member; a flexible wall defining with said rigid wall a chamber for fluid; surface engagement means having an actuator member secured to said flexible wall, said actuator member slidably receiving said piercing member; an external sleeve guide member for said actuator member; said passageway means extending from said chamber to below said surface engagement means when said flexible wall is positioned proximate to said rigid wall; and seal means for said passageway means when said flexible wall is positioned remotely from said rigid wall.

7. In an applicator for dispensing fluid including a reservoir for fluid provided with an open end having an edge means, the provision of: a rigid partition wall seated on said edge means; a flexible diaphragm wall defining a fluid chamber with said rigid wall and seated on said edge means; a guide sleeve member extending outwardly from said open end and seated on said edge means; means retaining said walls and sleeve member in assembly at said edge means; a pointed piercing member adjustably secured to the rigid partition wall; an actuator member sleeved over the piercing member and within the guide member, said actuator member providing a spring seat; and spring means ensleeved over said guide member and actuator member and having one end seated on said spring seat and its other end seated against said guide member; said piercing member being provided with valved passageway means in communication with said fluid chamber.

8. In an applicator for dispensing fluid including a reservoir for fluid provided with an open end having edge means, the provision of: a rigid partition wall; a flexible wall; a guide sleeve member on the side of said flexible wall opposite to the rigid wall; said rigid and flexible walls and said guide member having corresponding edge margins cooperably arranged with said edge means; retaining means for said walls and guide member to secure the same in assembly at said edge means; a pointed rigid piercing member secured to the rigid wall and extending through the flexible wall and guide member and provided with passageway means in communication with the space between said rigid wall and flexible wall; an actuator member secured to said flexible wall and slidable cooperably with said piercing member and said guide member; and spring means compressible between said guide member and means provided on said actuator member for biasing said actuator member.

9. An applicator as stated in claim 8 wherein said rigid wall is provided with a port, and a valve member is carried by said piercing member in cooperable relation to said port for admitting fluid to the space between said rigid wall and said flexible wall.

10. An applicator as stated in claim 8 including adjustable means connecting said piercing member to said partition wall to control depth of penetration of said piercing member.

References Cited in the file of this patent

UNITED STATES PATENTS

| 1,879,363 | Loepsinger | Sept. 27, 1932 |
| 2,290,363 | Stirton | July 21, 1942 |
| 2,479,895 | Bahnson | Aug. 23, 1949 |
| 2,560,060 | Zwosta | July 10, 1951 |
| 2,721,762 | Bates | Oct. 25, 1955 |

FOREIGN PATENTS

| 142,896 | Australia | Aug. 14, 1951 |